United States Patent

Omoto et al.

[11] Patent Number: 5,141,283
[45] Date of Patent: Aug. 25, 1992

[54] SLIDABLE ROOF DEVICE FOR A MOTOR VEHICLE

[75] Inventors: Seiichi Omoto; Kenji Matsumoto; Satoshi Kubota, all of Hiroshima, Japan

[73] Assignee: Mazda Motor Corporation, Hiroshima, Japan

[21] Appl. No.: 726,131

[22] Filed: Jul. 3, 1991

Related U.S. Application Data

[63] Continuation of Ser. No. 476,551, Feb. 7, 1990, abandoned.

[30] Foreign Application Priority Data

Feb. 10, 1989 [JP] Japan .................................. 1-32188
Aug. 11, 1989 [JP] Japan .................................. 1-209260

[51] Int. Cl.⁵ .......................... B60J 7/02; B60J 7/057
[52] U.S. Cl. .................................. 296/219; 296/223; 307/10.1; 318/466; 318/468
[58] Field of Search .................. 296/219, 223, 224; 307/10.1; 318/466, 468

[56] References Cited

U.S. PATENT DOCUMENTS

| 2,103,372 | 12/1937 | Lange ............................. 296/223 X |
| 2,770,489 | 11/1956 | Garvey et al. .................... 296/117 |
| 2,985,483 | 5/1961 | Bishop ............................ 296/219 X |
| 4,081,926 | 4/1978 | Jardin ............................. 296/223 X |
| 4,329,594 | 5/1982 | Bohm ............................. 296/223 X |
| 4,830,428 | 5/1989 | Masuda et al. .................... 296/219 |

FOREIGN PATENT DOCUMENTS

| 668406 | 2/1936 | Fed. Rep. of Germany ...... 296/224 |
| 1111964 | 7/1961 | Fed. Rep. of Germany ...... 296/219 |
| 1138650 | 10/1962 | Fed. Rep. of Germany ...... 296/224 |
| 0031819 | 2/1988 | Japan ............................. 296/219 |
| 63-40228 | 3/1988 | Japan . |
| 63-82883 | 4/1988 | Japan . |
| 0112217 | 5/1988 | Japan ............................. 296/219 |
| 0285423 | 11/1989 | Japan ............................. 296/219 |
| 165013 | 10/1933 | Switzerland .................... 296/219 |
| 1011473 | 12/1965 | United Kingdom ............. 296/219 |
| 1315364 | 5/1973 | United Kingdom . |

Primary Examiner—Dennis H. Pedder
Attorney, Agent, or Firm—Wenderoth, Lind & Ponack

[57] ABSTRACT

A slidable roof device for a motor vehicle is provided wherein a roof panel opening of a motor vehicle is openably covered by a flexible member. A front portion of the roof panel opening can be uncovered when a front portion of the flexible member is moved in the rearward direction of the vehicle body. A tilt mechanism is provided at a rear portion of the flexible member so as to tilt up the rear portion thereof and to form at least a clearance between the rear portion of the flexible member and the vehicle roof panel, thereby making sure that rear seat passengers can enjoy more a comfortable ride in the vehicle. Further, the tilt mechanism can be made to operate when the front portion of the flexible member is moved rearwardly so as to tilt up the rear portion of the flexible member to form at least a clearance between the rear portion thereof and the vehicle roof panel when the front portion of the flexible member is opened. The rear portion of the flexible member is operatively interconnected with the drive mechanism. The drive mechanism can move the rear portion of the flexible member in the forward direction of the vehicle, thus opening the rear portion of the roof panel opening of the vehicle.

17 Claims, 10 Drawing Sheets

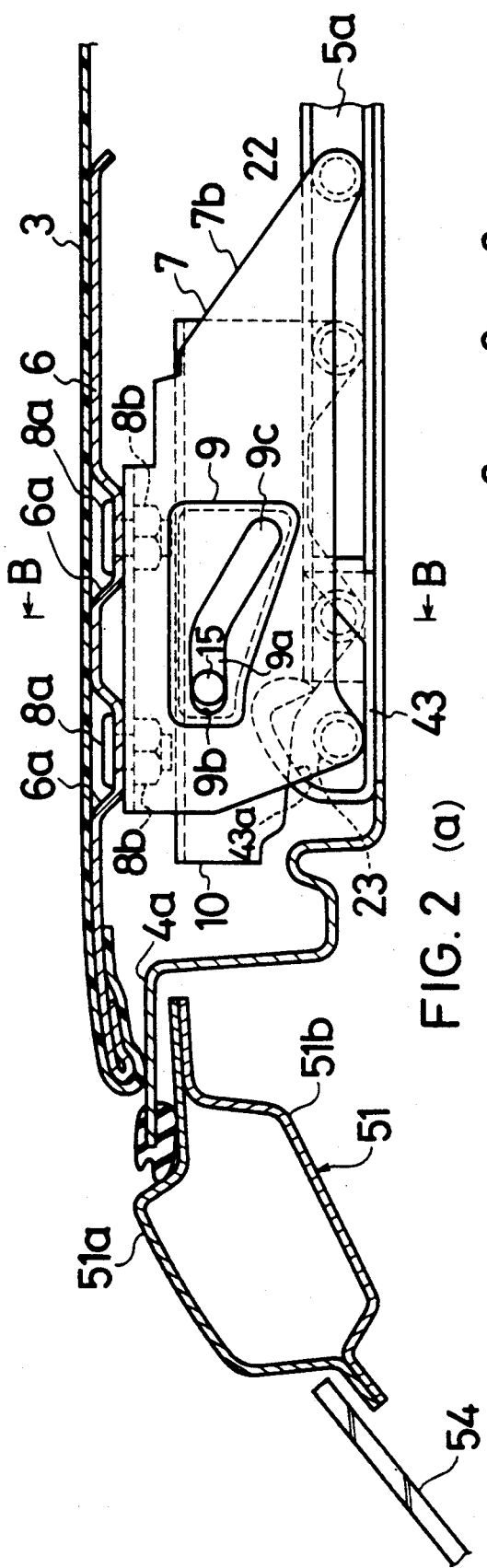
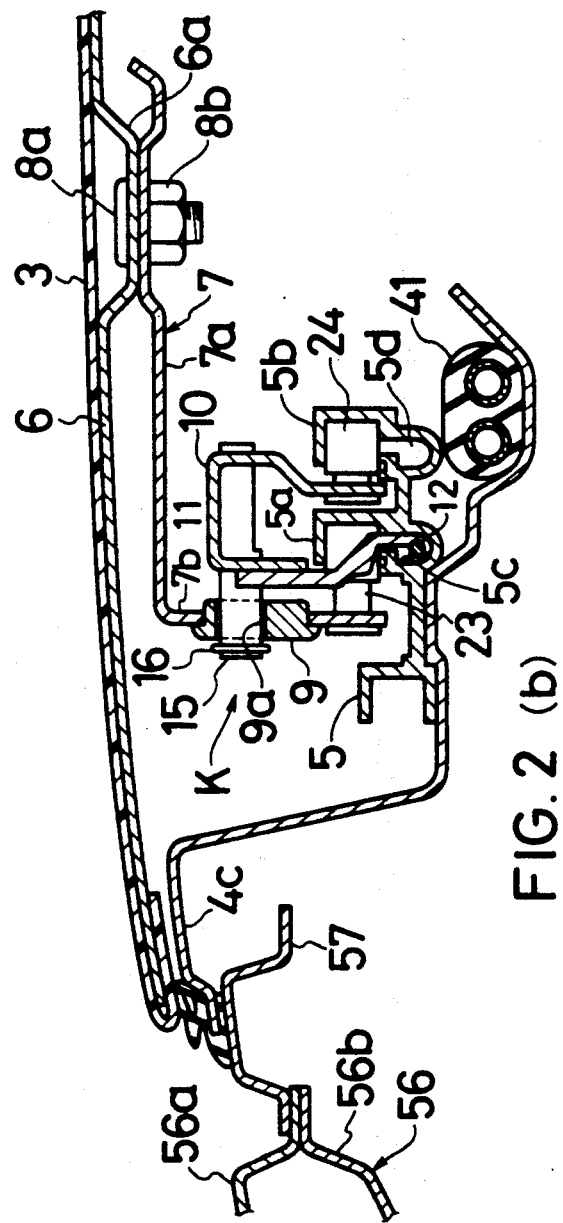
FIG. 2 (a)
FIG. 2 (b)

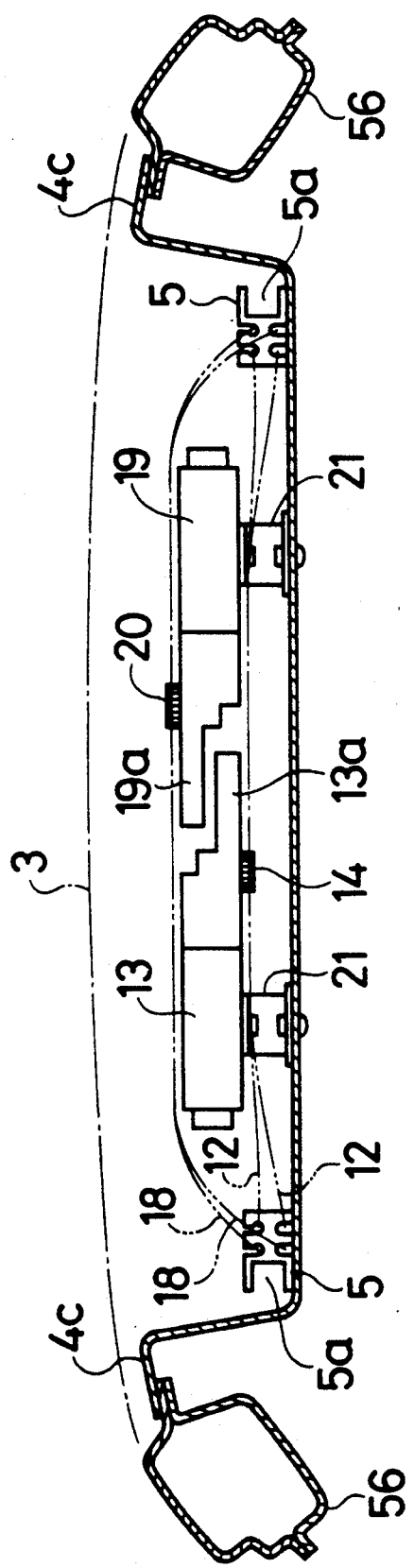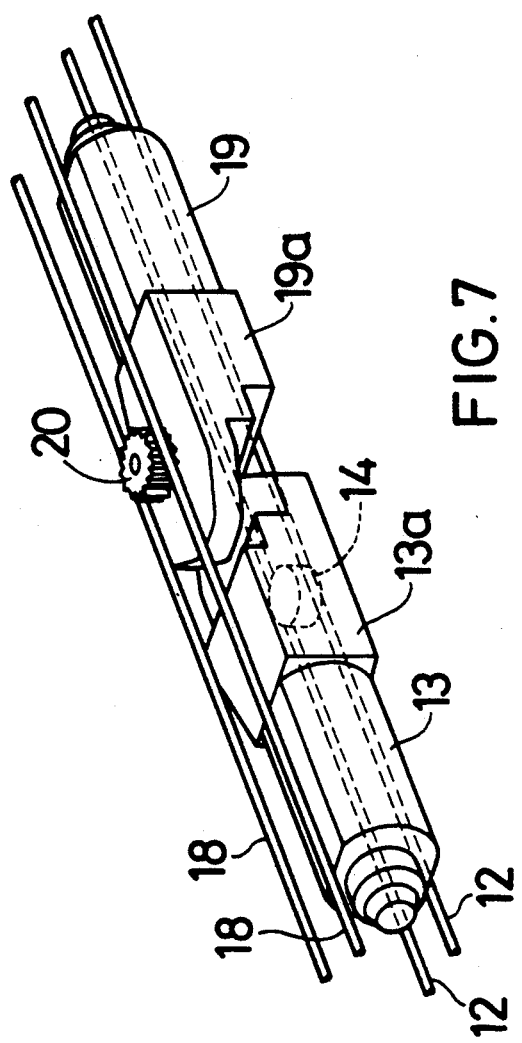

SLIDABLE ROOF DEVICE FOR A MOTOR VEHICLE

This application is a continuation of now abandoned application, Ser. No. 07,476,551 filed on Feb. 7, 1990.

BACKGROUND OF THE INVENTION

1. Field of the Invention

The present invention relates to a slidable roof device for a motor vehicle.

2. Description of the Prior Art

A slidable roof apparatus equipped with a flexible slidable roof member for covering a roof panel opening of a motor vehicle wherein the flexible member is openable from the forward to the rearward direction of a vehicle body has been known in the art as disclosed in Japanese Utility Model Application Laying Open Gazette No. 63-40228.

However, this type of slidable roof apparatus opens only the front of the roof panel opening of the vehicle body by opening the flexible member. Therefore, when there are passengers in the rear seat, the flexible member is folded into the rear portion of the roof panel opening and overlies the passengers in the rear seat. This means that even if the roof panel opening is fully opened, the passengers in the rear seat may feel uncomfortable and stifled.

A further disadvantage of this apparatus is that, since only the front of the roof panel opening can be opened, the air flowing into the vehicle through the opening will not circulate, such that the ventilation provided thereby is inadequate. In addition, opening only the front portion of the roof panel opening may have the result that the vehicle cabin will function as a kind of resonance box, resulting in a resonance or a throbbing sound.

SUMMARY OF THE INVENTION

The primary object of the present invention is to provide a slidable roof device for a motor vehicle which can offer passengers in the rear seat a comfortable ride as well as improve the ventilation of the vehicle.

To achieve the above-mentioned objects, a slidable roof device for a motor vehicle in the present invention includes: a roof panel constituting an upper portion of a vehicle body; a roof panel opening provided on the roof panel of the vehicle body and enclosed with a front header, right and left roof rails and a rear header; a flexible member mounted on the roof panel and foldable in the longitudinal direction of the vehicle body. The flexible member is selectively movable between a folded state for opening the roof panel opening and an extended state for closing the roof panel opening. A first drive means is operatively interconnected with the front portion of the flexible member for selectively moving the front portion thereof in the rearward and forward directions of the vehicle body. A control means is operatively interconnected with the first direct means for controlling the first drive means to move the front portion of the flexible member in the rearward direction of the vehicle body to open the front portion of the roof panel opening, and in the forward direction of the vehicle body to close the front of the roof panel opening. The device of the present invention further comprises tilt means operatively interconnected with the rear portion of the flexible member for tilting up the rear portion thereof in the upward direction to form at least a clearance between the flexible member and the roof panel of the vehicle.

In this invention, the tilt means tilts up the rear portion of the flexible member to make at least a clearance between the rear portion of the flexible member and the vehicle roof panel. Accordingly, passengers in the rear seat will not feel stifled in the vehicle. In addition, when opening the front of the roof panel opening by moving the front portion of the flexible member in the rearward direction of the vehicle body, a clearance made in the rear portion of the flexible member by the tilt means will be effective in improving the circulation of air and ventilation inside the vehicle cabin. As a result, the air inside the cabin will not become stagnated and the resonance effect is prevented.

The slidable roof device for a motor vehicle of the present invention is provided with second drive means operatively interconneted with the rear portion of the flexible member through the tilt means. The second drive means activates the tilt means to tilt up the rear portion of the flexible member. This second drive means also opens the rear of the roof panel opening of the vehicle body by moving the rear portion of the flexible member in the forward direction of the vehicle body. In this way, in addition to opening of the front portion of the roof panel opening of the vehicle body, the rear portion of the roof panel opening can be opened in the present invention when the rear portion of the flexible member moves in the forward direction of the vehicle. Thus, passengers in the rear seat can enjoy a more comfortable ride in the vehicle.

The present invention provides the slidable roof device for a motor vehicle wherein the second drive means is operatively interconnected with the first drive means so that the tilt means tilts up the rear portion of the flexible member in association with the opening of the front portion thereof to form at least a clearance between the rear portion of the flexible member and the vehicle roof panel. Accordingly, the tilt means is interlocked with the opening motion of the front portion of the flexible member so as to tilt up the rear portion of the flexible member when the front portion thereof opens. This tilt means creates a clearance between the rear portion of the flexible member and the vehicle roof panel. As a result, without any additional operation, passengers in the rear seat can enjoy a comfortable ride due to the improved air circulation. In this way, ventilation is facilitated and resonance can be avoided.

The device of the present invention includes tilt-up detecting means for detecting the state when the rear portion of the flexible member is fully tilted up. The control means receives an output from the tilt-up detecting means to control the second drive means to move the rear portion of the flexible member in the forward direction of the vehicle body after the tilt-up motion. In other words, in the present invention, the rear portion of the flexible member moves in the forward direction due to the operation of the second drive means only after the tilt-up motion has been completed. In order to avoid any trouble for the driver and a front seat passenger when passengers in the rear seat tilt up the rear portion of the flexible member, the control means in the device, responsive to the output from the tilt-up detecting means, prohibits activation of the first drive means during the tilt-up motion of the rear portion of the flexible member. Preferably, the tilt-up detecting means comprises a limit switch.

The device further includes a lock detecting means for detecting the locking states of the first and second drive means. The control means, responsive to the output from the lock detecting means, halts the drive control of the first or second drive means. Accordingly, drive means is stopped when the flexible member reaches a fully open state or a fully closed state, thereby relieving the drive means of unnecessary overload.

The tilt means comprises a mounting bracket provided at the rear portion of the flexible member, a slider connected with the drive means and being movable in the longitudinal direction of the vehicle body, an engaging pin member attached to the slider, and a cam member being provided at the mounting bracket and having a cam groove with which the engaging pin member slidably engages. The engagement between the engaging pin member and the cam groove of the cam member forms a means for tilting up the rear portion of the flexible member.

For tilting up the rear portion of the flexible member with a simple configuration, the cam groove of the cam member comprises a horizontal groove portion extending substantially in the horizontal direction, and an inclined groove portion inclined forwardly and downwardly from the front end of the horizontal groove portion. When the engaging pin member travels from the horizontal groove portion to the inclined groove portion, the rear side of the mounting bracket moves to the upper portion, thus tilting up the rear portion of the flexible member.

The foregoing and other objects, and novel features of the invention will become more apparent upon reading the following detailed description with reference to the drawings.

BRIEF DESCRIPTION OF THE DRAWINGS

The accompanying drawings show a preferred embodiment of the present invention, in which:

FIG. 2(a) is a sectional view taken along the line A—A of FIG. 1;

FIG. 2(b) is a sectional view taken along the line B—B of FIG. 2(a);

FIG. 6 is a sectional view taken along the line IV—IV of FIG. 5;

FIG. 7 is a perspective view showing the relation among the drive motor, a drive wire and a gear;

DETAILED DESCRIPTION OF THE PREFERRED EMBODIMENT

A preferred embodiment of the present invention will be described in detail in connection with the accompanying drawings.

Figure 1:
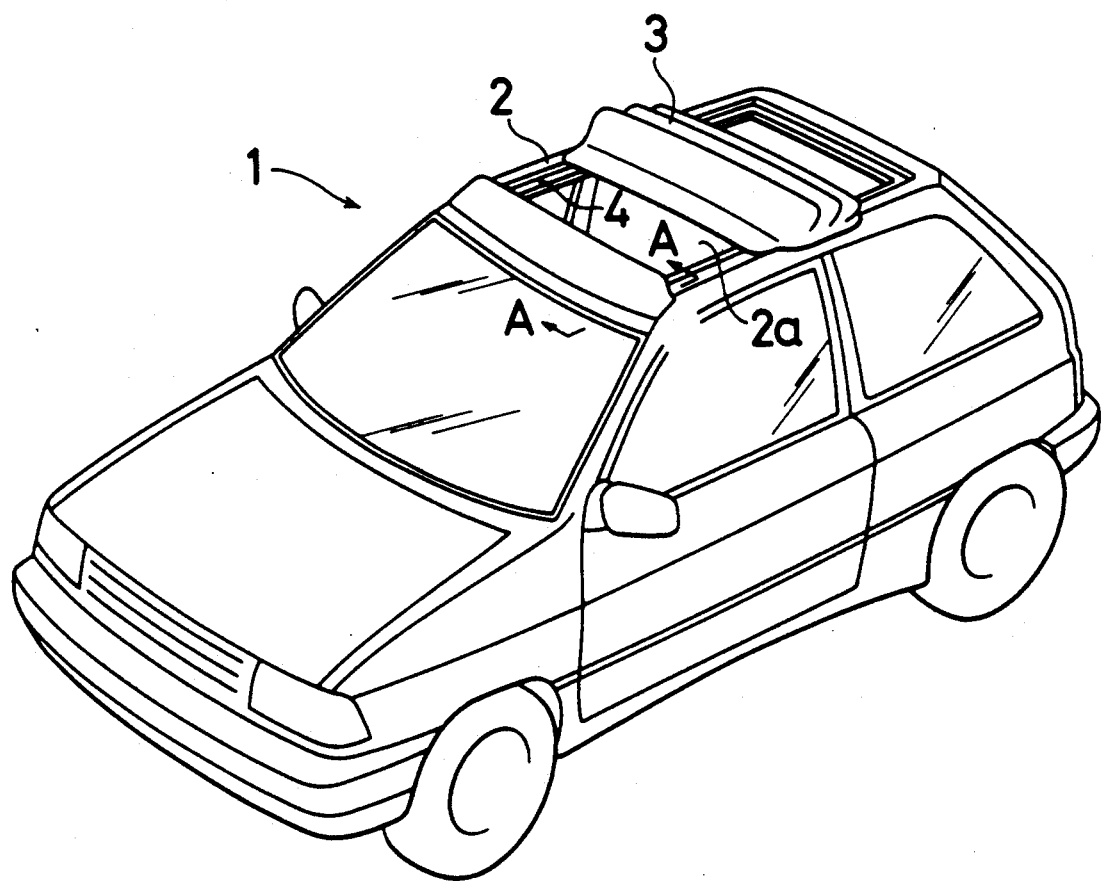
FIG. 1 is a perspective view of a motor vehicle which has adopted the present invention.

Referring to FIG. 1, reference numeral 1 designates a motor vehicle. A roof panel 2 of the motor vehicle 1 has an opening 2a. This roof panel opening 2a is openably and closably covered with a flexible member 3 (a hood member). More specifically, the flexible member 3 is foldably provided in the longitudinal direction on the vehicle roof panel 2 so as to be selectively movable in the longitudinal direction between a folded state for opening the roof panel opening 2a and an extended state for closing the opening 2a.

Mounted on the vehicle roof panel 2 is a rectangular-shaped frame member 4. Guide rails 5, 5 (refer to FIGS. 2(a) and (b)) are provided at the both sides of the frame member 4. Foldably mounted along the guide rails 5, 5 is the flexible member 3 so as to be openable (foldable) in the longitudinal direction of the vehicle body in both the forward or rearward directions thereof.

More closely looking at the front portion of the flexible member 3, as shown in FIGS. 2(a) and (b), formed at the right and the left side of a front plate member 6 are mounting portions 6a, 6a on which a mounting bracket 7 is fixed by means of bolts 8a and nuts 8b. The mounting bracket 7 includes a base 7a fixed on the mounting portions 6a, 6a, and a supporting portion 7b extending downwardly from the outer periphery of the base 7a. A cam member 9 having a cam groove 9a is secured by the supporting portion 7b. The cam groove 9a includes a front horizontal groove portion 9b extending substantially in the horizontal direction, and a rear inclined groove portion 9c extending downwardly and rearwardly from the rear end of the horizontal grove portion 9b.

A slider 10 having a substantially inverted U-shape in cross section is connected with the mounting bracket 7 by means of an engaging pin 15. This engaging pin 15 slidably engages with the cam groove 9a of the cam member 9. The engaging pin member 15 projects sideward from the upper portion of the slider 10. The end portion of the engaging pin member 15 passing through the cam groove 9a of the cam member 9 is provided with a snap ring 16 whereby the mounting bracket 7 and the slider 10 are connected. The engagement between the engaging pin member 15 and the cam member 9a of the cam member 9 constitutes a tilt means K for tilting up the front portion of the flexible member 3 at the initial phase of the opening operation.

The rear part of the supporting portion 7b of the mounting bracket 7 has, at the lower end thereof, a shoe member 22 which slidably engages with an outside guide groove 5a of the guide rail 5, while the front part of the supporting portion 7b has, at the lower end thereof, another shoe member 23 which slides on the upper surface of the guide rail 5. Thus, with this arrangement, the front end portion of the flexible member 3 moves upward when the flexible member 3 retreats (i.e. as it is folded).

The slider 10 slidably engages with an inside guide groove 5b of the guide rail 5 by means of shoe members 24, 24. A guide bracket 11 corresponding to the guide rail 5 is fixed to the slider 10. The guide bracket 11 is also connected with a front drive wire 12 which is located in a housing groove 5c outside the guide rail 5.

As shown in FIGS. 4 through 7, the drive wire 12 engages with a gear 14 which is rotated by a first drive motor 13 located substantially at the center of the rear side of the frame member 4. The drive wire 12 extends inside a front idle cable housing portion 41a, an outer idle cable housing of a cable housing member 41 located below the other guide rail 5. With the rotation of the first drive motor 13, the drive wire 12 opens the front portion of the flexible member 3. As a result, the front portion of the roof panel opening 2a is opened.

Accordingly, when opening the front portion of the flexible member 3, first the slider 10 withdraws and this withdrawal changes the relation of the engagement between the engaging pin member 15 and the cam groove 9a of the cam member 9 so as to restrict the position of the mounting bracket 7. Then the front portion of the mounting bracket 7 moves upward against the slider 10. As a result, the front plate member 6, i.e. the front portion of the flexible member 3 tilts up and then withdraws to open.

Figure 3:
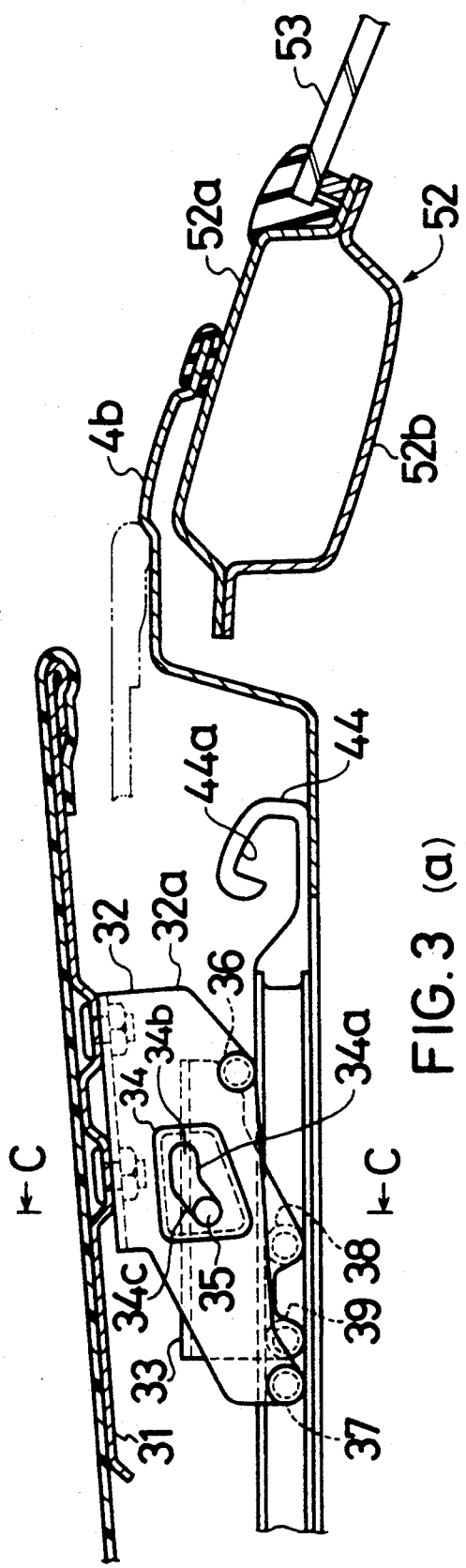
FIG. 3(a) is a view similar to FIG. 2(a) but showing the rear of a roof panel opening of a vehicle body.
FIG. 3(b) is a sectional view taken along the line C—C of FIG. 3(a)
Figure 3:
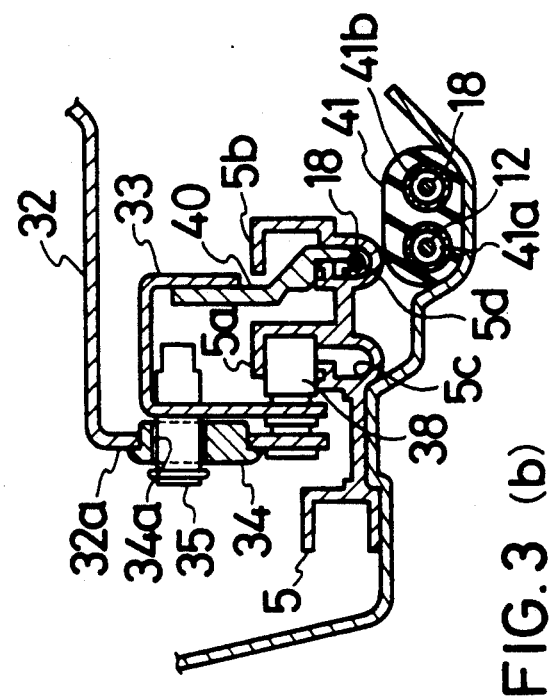
Figure 4:
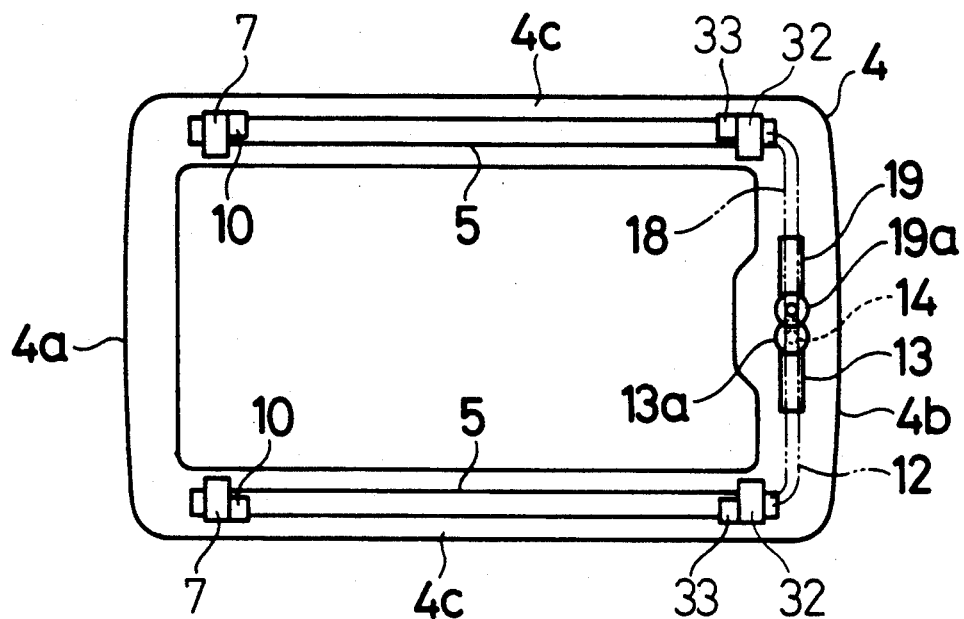
FIG. 4 is a schematic plan view of a frame member.
Figure 5:
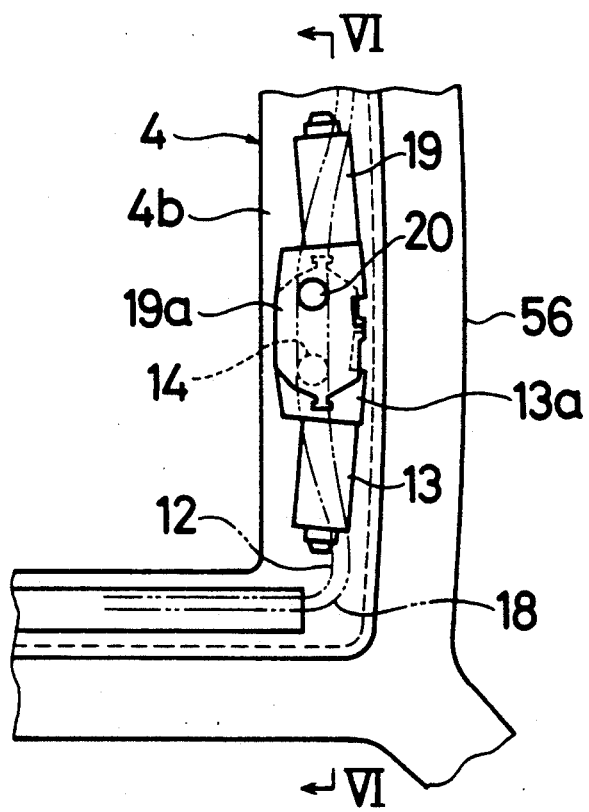
FIG. 5 is a partly plan view showing a portion wherein a drive motor is mounted.

The rear portion of the flexible member 3 opens in the same manner as the front portion thereof. That means the rear plate member 31, i.e. the rear portion of the flexible member 3, tilts up and then moves forward to open the rear of the roof panel opening 2a. More specifically, as shown in FIGS. 3(a), (b), a mounting bracket 32 is fixed on the rear plate member 31. A slider 33 is connected with a supporting portion 32a of the mounting bracket 32 by means of an engaging pin member 35 which slidably engages with a cam groove 34a of a cam member 34 fixed on the mounting bracket 32. In contrast with the cam groove 9a of the front cam member 9, the cam groove 34a comprises a rear horizontal groove portion 34b extending substantially in the horizontal direction, and an inclined groove portion 34c extending downwardly and forwardly from the front end of the horizontal groove portion 34b. The mounting bracket 32 and the slider 33 are provided with guide shoes 36, 37 and 38, 39.

A rear drive wire 18 is connected by means of a guide bracket 40, with the slider 33 which tilts up or opens the rear plate member 31. The rear drive wire 18 is disposed in a housing groove 5d inside the guide rail 5. The rear drive wire 18 engages with a gear 20 which is rotated by a second drive motor 19 located substantially at the center in the rear portion of the frame member 4. Then the rear drive wire 18 extends inside a rear idle cable housing portion 41b, an inner idle cable housing of the cable housing member 41 located below the other guide rail 5. With this arrangement, the rear drive wire 18 is operated by the rotation of the second drive motor 19.

Both first and second drive motors 13, 19 are located substantially at the center of the rear portion of the frame member 4. In this way, the first and second drive motors 13, 19 are disposed in one place so as not to reduce the opening area of the roof panel opening 2a. Furthermore, a portion of reduction gear parts 13a, 19a which are small in the vertical direction are vertically superposed. In this way, a relatively small space (especially the space in the widthwise direction) is required for disposing the first and the second motors 13, 19. The gears 14, 20 are located respectively under the reduction gear part 13a and above the reduction gear part 19a. The drive motors 13, 19 are mounted on the frame member 4 by means of brackets 21, 21 (refer to FIG. 6).

Stopper members 43, 44 are mounted respectively at the front and rear ends of the guide rails 5, 5. The interval in the longitudinal direction between the stopper members 43 and 44 is set longer than the length of the flexible member 3 when the flexible member 3 is in the fully-closed state by its tensile force. Accordingly, either the front portion closes first or the rear portion closes first. The flexible member 3 is always fully extended when closed. The stopper members 43, 44 are provided with upwardly-indented stopper grooves 43a, 44a with which the guide shoes 23, 36 engage. For example, if the front portion of the flexible member 3 (the guide shoe 23) first makes contact with the stopper member 43, the front portion tends to be pulled rearwardly when closing the rear portion. However, this force in the rearward direction is a tensile force of the flexible member 3 and it acts upwardly against of the engaging pin member 15. Therefore, the front portion of the flexible member 3 (the front plate member 6) pivotally moves upward with the engaging pin member 15 as a rotational axis. Thus, the guide shoe 23 engages with the stopper groove 43a of the stopper member 43. As a result, the rearward force can be restricted. On the other hand, when opening the front portion of the flexible member 3, force is generated by the drive wire 12. This force acts downwardly against the engaging member 15. Therefore, even when the guide shoe 23 engages with the stopper groove 43a of the stopper member 43, the engagement is released. Thus, the front portion of the flexible member 3 withdraws smoothly, opening the roof panel opening 2a.

Although not shown in the drawings, a folding mechanism as disclosed in Japanese Utility Model Application Laying Open Gazette No. 63-40228 is mounted between the front plate member 6 and the rear plate member 31 in the flexible member 3. This folding mechanism makes the flexible member 3 foldable.

A front portion 4a of the frame member 4 is provided on a front header 51 with a closed cross section. The front header 51 comprises an upper panel 51a and a lower panel 51b. The front portion 4a of the frame member 4 extends rearwardly from the front header 51. The part where the front portion 4a extends from the front header 51 is covered with the front portion of the flexible member 3 (the front plate member 6). Likewise, the rear portion 4b of the frame member 4 is provided on a rear header 52 with a closed cross section. The rear header 52 comprises an upper panel 52a and a lower panel 52b. Reference numerals 53, 54 designate respectively a rear window glass and a front window glass.

Side portions 4c, 4c of the frame member 4 are mounted on an outer portion 56a of roof rail 56 with a closed cross section. The roof rail 56 comprises this roof rail outer portion 56a and a roof rail inner 56b. The roof rails 56, as well as the front header 51 and the rear header 52 enclose the roof panel opening 2a.

Figure 8:
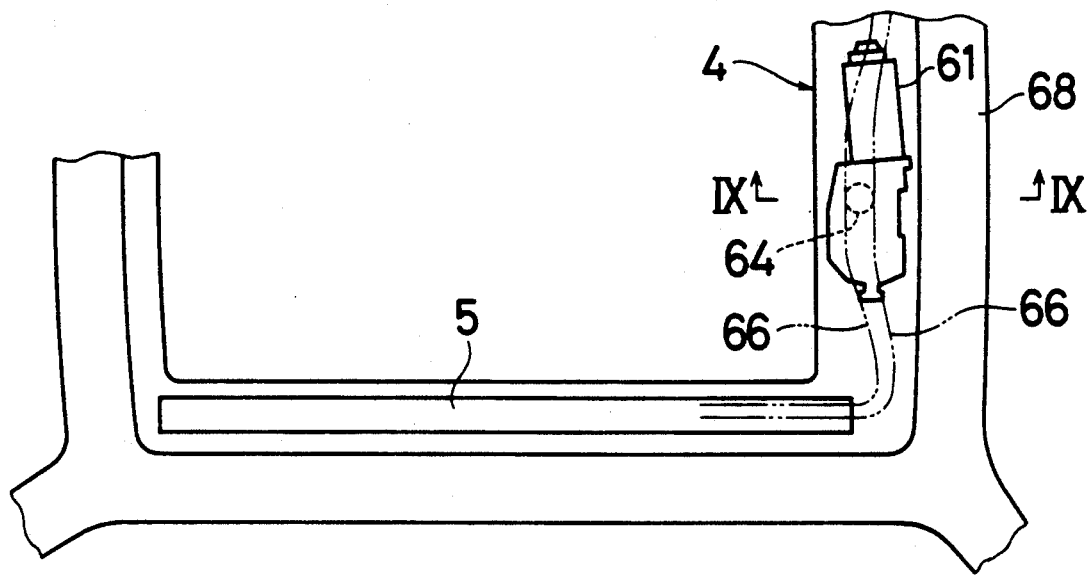
FIG. 8 is a schematic plan view showing another embodiment.
Figure 9:
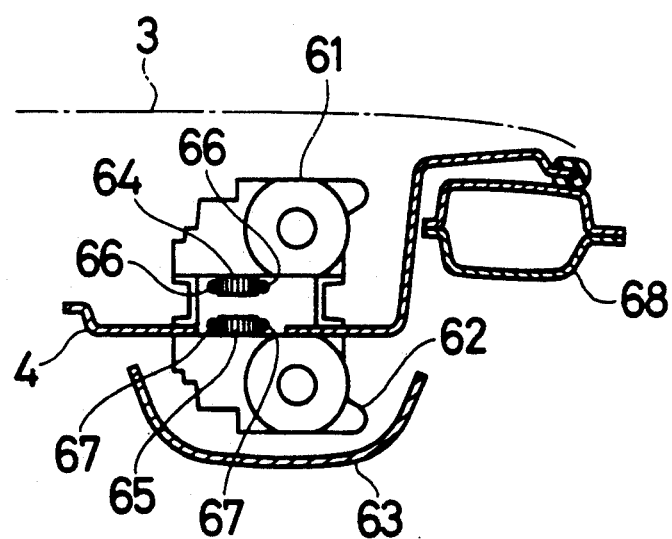
FIG. 9 is a section view taken along the line IX—IX of FIG. 8.

In the aforementioned embodiment of the present invention a portion of the reduction gear parts 13a, 19a of the first and the second drive motors 13, 19 are vertically superposed. However, the superpositioning of the reduction gear parts 13a, 19a is not limited to the vertical direction. Furthermore, not only small portions but also the entirety of the reduction gear parts 13a, 19a can be superposed. As shown in FIGS. 8 and 9, the drive motors 61, 62 can be disposed in upper and lower positions in the frame member 4 so as to be entirely superposed. In this case, the lower drive motor 62 is covered with a trim 63. Reference numerals 64, 65 designate gears with which the drive wires 66, 66, 67, 67 engage. Reference numeral 68 designates a rear header.

Figure 15:
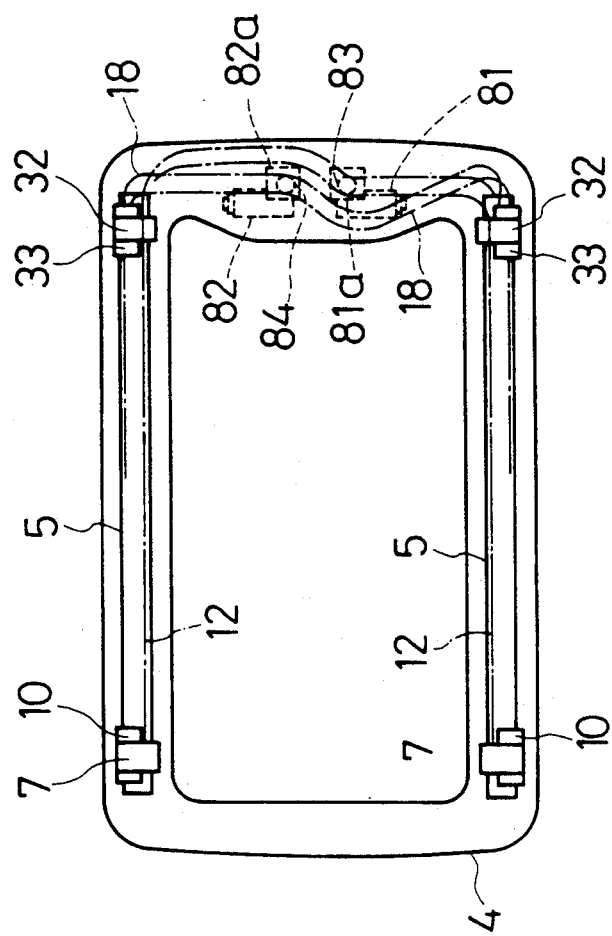
FIG. 15 is a plan view of the frame member which is provided with the drive motor.
Figure 16:
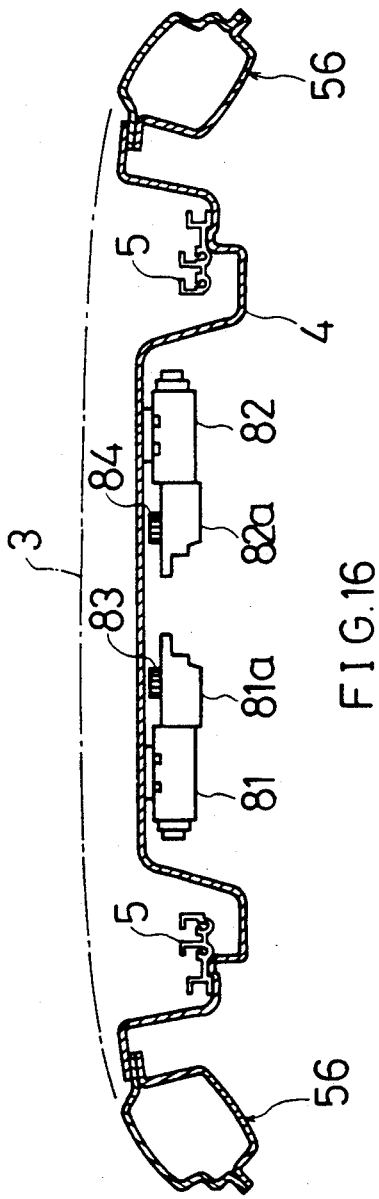
FIG. 16 is a sectional view showing a portion wherein the drive motor is mounted.

In addition, as shown in FIGS. 15 and 16, the drive motors 81, 82 having the reduction gear parts 81a, 82a can be mounted apart from each other instead of being superposed. That means the drive motors 81, 82 are disposed in the lower position of the frame member 4 so that the drive motors 81, 82 are spaced apart in the widthwise direction of the vehicle body. In this case, each of the drive motors 81, 82 is covered with trim (not shown in the drawings). Reference numerals 83, 84 designate gears with which drive wires 12, 12, 18, 18 engage.

The following is a description of a control system which controls the above-mentioned drive motors 13, 19 (61, 62).

Figure 10:
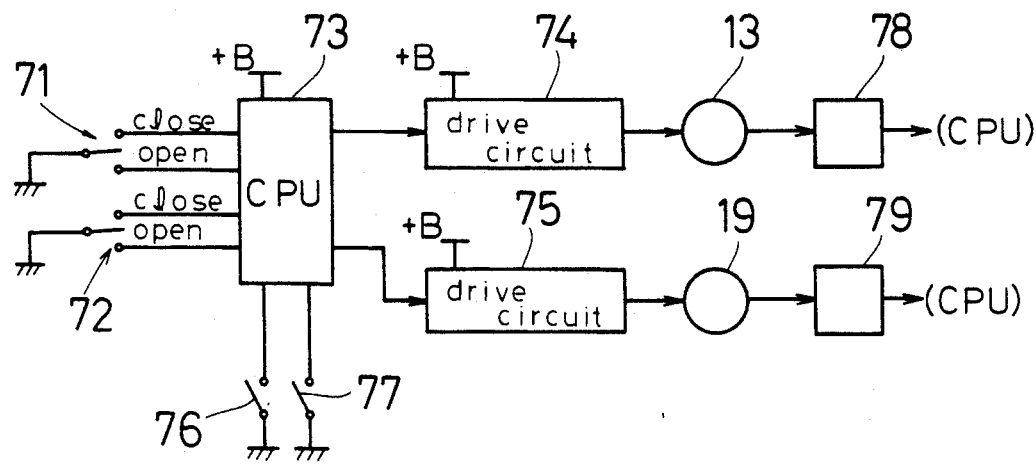
FIG. 10 is a block diagram showing a construction of a control system.

In FIG. 10, reference numerals 71, 72 designate a forwardly located front ON/OFF switch and a forwardly located rear ON/OFF switch, each provided close to the driver seat for opening or closing the front and rear portions of the flexible member 3. CPU 73 receives ON/OFF signals from the switches 71, 72 and controls the first and second drive motors 13, 19 by means of the drive circuits 74, 75.

Reference numerals 76, 77 designate respectively a front limit switch and a rear limit switch. These front and rear limit switches 76, 77 sense the tilt-up state of the front and rear portions, respectively, of the flexible member 3 and then input the detection signals to the CPU 73.

Reference numerals 78, 79 designate lock detecting means for the drive motors 13, 19. The lock detecting means 79, 80 detect when the respective front and rear portions of the flexible member 3 are fully open or fully closed (refer to FIG. 1), and then sends a detection signal or signals to the CPU 73. Finally, in response to the signals from the lock detecting means, CPU 73 prohibits the drive circuits 74, 75 from sending the operation signal to the respective drive motor 13, 19, such that activation of the respective drive motor 13, 19 is terminated.

Figure 11:
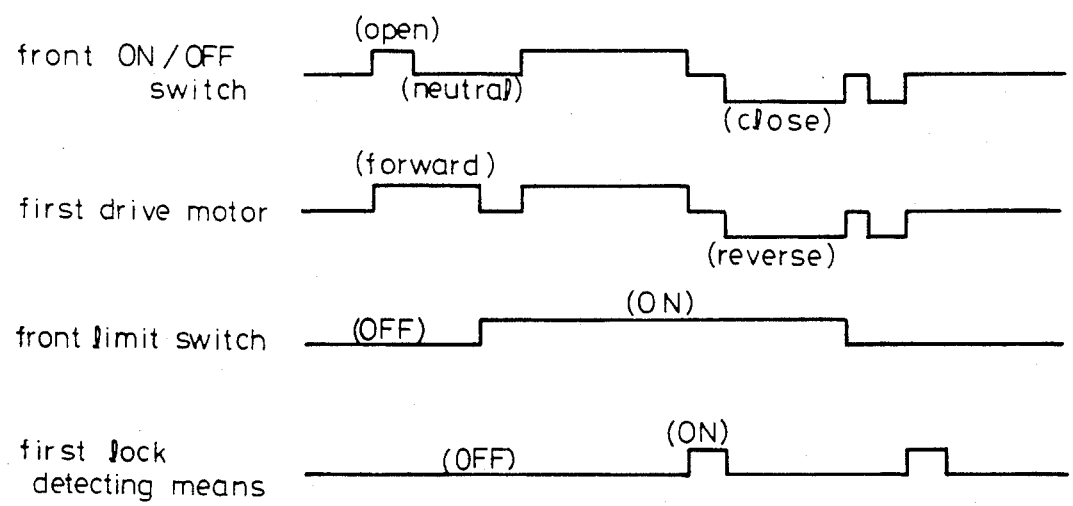
FIGS. 11 through 14 are time charts showing control operations.

Control for opening and closing the front portion of the flexible member 3 by the control system is illustrated in FIG. 11. For example, when the front ON/-OFF switch 71 is in the opening position, the first drive motor 13 is activated and tilts up the front portion of the flexible member 3. In detail, the activation of the first drive motor 13 operates the drive wires 12, 12. As a result, the slider 10 slightly withdraws backward, and causes movement of the engaging pin member 15 from the horizontal groove portion 9b to the inclined groove portion 9c of the cam groove 9a of the cam member 9. Since the position of the engaging pin member 15 is restricted in the vertical direction, the front part of the mounting bracket 7 moves upward. In other words, the rear shoe member 22 of the mounting bracket 7 is positioned in the guide groove 5a of the guide rail 5 while the front shoe member 23 is positioned on the upper surface of the guide rail 5. Accordingly, since the mounting bracket 7 is attached on the front plate member 6 by means of the mounting portions 6a, 6b, the front plate member 6 tilts up, thereby creating the clearance between the rear portion of the flexible member 3 and the vehicle roof panel 2.

At the end of the tilting-up motion (i.e. when the front portion of the flexible member 3 is in a tilted-up state), the front limit switch 76 enters into the ON state, and the first drive motor 13 is stopped. When the front ON/OFF switch 71 is then set in the open position, the drive motor 13 is activated and the front plate member 6 together with the slider 10 withdraw and cause folding of the front portion of the flexible member 3, thereby opening the front portion of the roof panel opening 2a.

When the flexible member 3 becomes fully opened, the lock detecting means 78 detects the locking state of the drive motor 13 and again stops the drive of drive motor 13.

When setting the front ON/OFF switch 71 in the closed position when the flexible member 3 is in this state, the front portion of the flexible member 3 is moved forwardly due to the activation of the drive motor 13. Then, when the flexible member 3 reaches the front end position and the front ON/OFF switch 71 is again set in the closed position, the tilt-up state is released due to the activation of the drive motor 13 and, as a consequence, the front limit switch 76 is placed in an OFF state. Finally, the lock detecting means 78 detects the locking state and is placed in an ON state, indicating to the CPU 73 the end of the opening and closing motion of the front portion of the flexible member 3.

Figure 12:
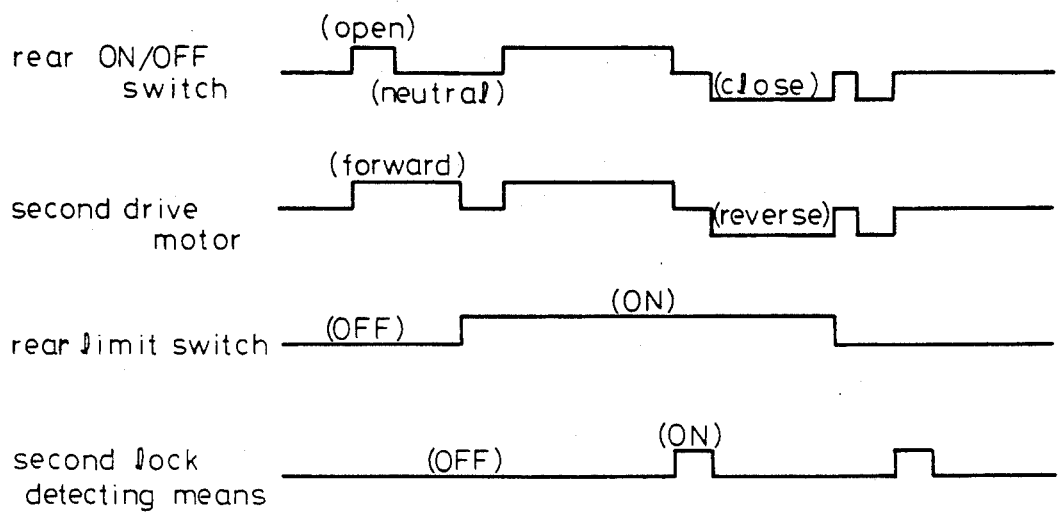

As shown in FIG. 12, the opening and the closing of the rear portion of the flexible member 3 is controlled by the rear ON/OFF switch 72 in the same manner as the front portion thereof.

When activating the second drive motor 19, the rear plate member in the rear portion of the flexible member 3 moves forward along with forward movement of the sliders 33, 33. Therefore, the rear portion of the flexible member 3 is tilted-up and folded to open the rear portion of the roof panel opening 2a in the same manner as the front portion of the flexible member 3. Thus, the passengers in the rear seat can enjoy the upward view and can enjoy a comfortable ride.

With the activation of the first and second drive motors 13, 19, the drive wires 12, 12, and 18, 18 independently operate to move the right and the left sliders 10, 10, and 17, 17, respectively. Consequently, the front and rear portions of the flexible member 3 can be moved independently of one another.

As explained in the preceding description, when the front portion of the roof panel opening 2a is in the open state, the opening of the rear portion of the roof panel opening 2a will lead to circulation of air in the longitudinal direction of the vehicle body and will prevent the air from stagnating in the vehicle cabin due to the improved ventilation. Furthermore, the occurrence of any resonance or throbbing sound inside the vehicle cabin is prevented.

In the above embodiment, the tilt-up motion of the flexible member 3 is carried out independently of the opening of the front portion of the roof panel opening 2 by the flexible member 3. However, to enhance the ventilation capacity, it is also possible to operatively interconnect the drive motors 13, 19 so as to control the CPU 73 to tilt up the rear portion of the flexible member 3 to create at least the clearance between the rear portion of the flexible member 3 and the roof panel in association with the opening of the front portion of the flexible member 3.

Figure 13:
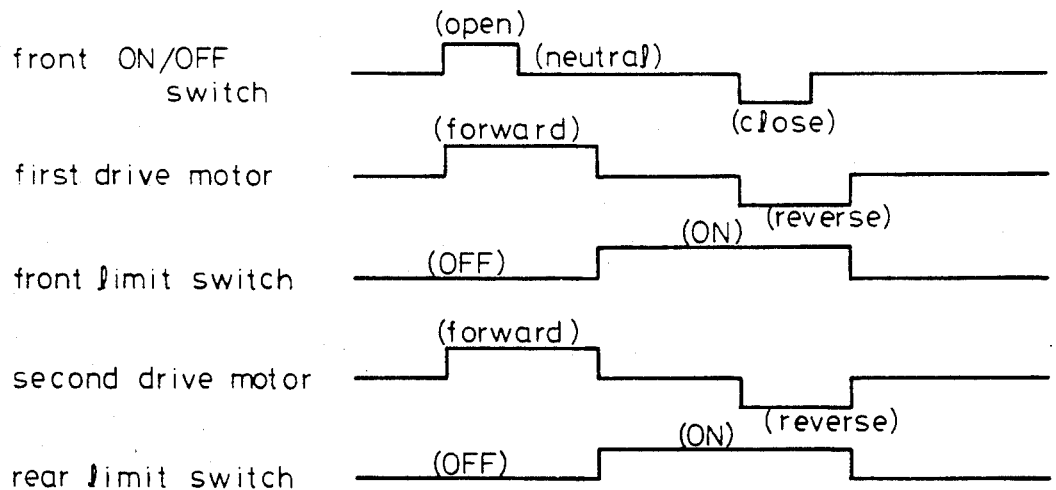

In this case, the control is illustrated in the time chart of FIG. 13. More specifically, when the front ON/OFF switch 71 is in the opening position, the first and second drive motors 13, 19 are driven forward at a fixed rate to tilt up the front and the rear portions of the flexible member 3. Likewise, when the front ON/OFF switch 71 is in the closed position, the first and second drive motors 13, 19 are reversed so as to release the tilt-up state of the front and rear portions of the flexible member 3.

In this way, when opening the front portion of the flexible member 3, without any additional operation, circulation of air can be improved and passengers on the rear seat can feel comfortable and refreshed, due to the excellent ventilation provided inside the vehicle.

Figure 14:
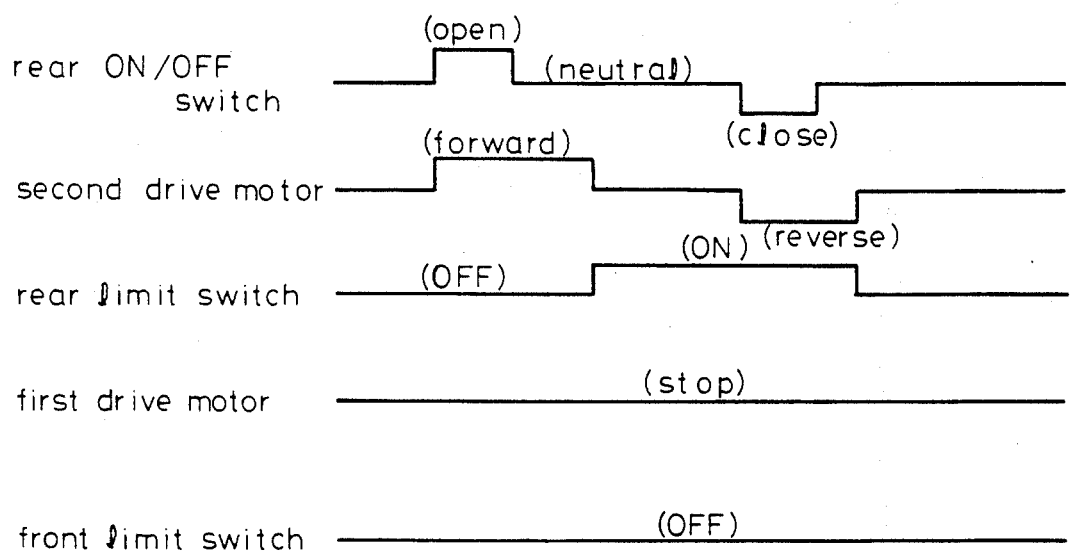

As shown in FIG. 14, when tilting up the rear portion of the flexible member 3 with the rear ON/OFF switch 72, operation of the first drive motor 13 and tilt-up motion of the front portion of flexible member 3 can be prevented so as to avoid inconvenience to the front seat passengers due to opening of the front portion of flexible member 3 when rear seat passengers operate the rear ON/OFF switch 72 so as to tilt-up the rear portion of the flexible member 3. In this way, the tilt-up motion of the rear portion of flexible member 3 can be carried out independently of the tilt-up motion of the front portion of the flexible member 3, with respect to operation of the rear ON/OFF switch 72. In this case, the front limit switch 76 for detecting the tilt-up motion of the front portion of the flexible member 3 is in the OFF state.

As many apparently widely different embodiments of this invention may be made without departing from the spirit and scope thereof, it is to be understood that the present embodiment is therefore illustrative and not restrictive. The cope of the invention is defined by the appended claims rather than by the description preceding them, and all changes that fall within the meets and bounds of the claims, or equivalents of such meets and bounds are therefore intended to be embraced by the claims.

We claim:

1. A slidable roof control device for a motor vehicle having a roof panel defining an upper portion of a vehicle body, a roof panel opening formed in said roof panel and enclosed by a front header, a right roof rail, a left roof rail and a rear header, and a flexible member mounted on the roof panel and being foldable in the longitudinal direction of the vehicle body, said control device comprising:

first drive means operatively interconnected with a front portion of said flexible member for selectively moving said front portion of said flexible member rearwardly so as to open a front portion of the roof panel opening and forwardly so as to close the front portion of the roof panel opening;

first tilt means, comprising first and second relatively movable tilt elements, operatively interconnected with said front portion of said flexible member for forcing said front portion of said flexible member to automatically tilt upwards, so as to be inclined upwardly and forwardly, as a result of one of said first and second tilt element being moved rearwardly beyond a first predetermined location relative to the other of said first and second tilt elements, so as to form a clearance between said front portion of said flexible member and the vehicle roof panel;

second drive means operatively interconnected with a rear portion of said flexible member for selectively moving said rear portion of said flexible member forwardly to open a rear portion of the roof panel opening and rearwardly so as to close the rear portion of the roof panel opening;

second tilt means, comprising third and fourth relatively movable tilt elements, operatively interconnected with said rear portion of said flexible member for forcing said rear portion of said flexible member to automatically tilt upwards, so as to be inclined upwardly and rearwardly, as a result of one of said third and fourth tilt elements being moved forwardly beyond a second predetermined location relative to the other of said third and fourth tilt elements, so as to form a clearance between said rear portion of said flexible member and the vehicle roof panel;

control means for controlling operation of said first and second drive means;

first ON/OFF switch means for commanding said control means to operate said first drive means;

second ON/OFF switch means for commanding said control means to operate said second drive means;

first tilt-up detecting means for detecting when said front portion of said flexible member is fully tilted up, and for outputting a signal to said control means to indicate that said front portion of said flexible member is fully tilted up;

second tilt-up detecting means for detecting when said rear portion of said flexible member is fully tilted up, and for outputting a signal to said control means to indicate that said rear portion of said flexible member is fully tilted up; and wherein said control means is operative to operate said first and second drive means independently in response to said first and second ON/OFF switch means, respectively.

2. A slidable roof control device as recited in claim 1, wherein said control means is further operative, in response to actuation of said first ON/OFF switch means when said front portion of said flexible member is located in a forward most position, to cause said first drive means to move said front portion of said flexible member rearwardly until said first tilt-up detecting means detects that said front portion is fully tilted up, and, in response to actuation of said second ON/OFF switch means when said rear portion of said flexible member is located in a rearward most position, to cause said second drive means to move said rear portion of said flexible member forwardly until said second tilt-up detecting means detects that said rear portion is fully tilted up.

3. A slidable roof control device as recited in claim 2, further comprising first lock detecting means for detecting when said front portion of said flexible member is in fully closed and fully opened positions;

second lock detecting means for detecting when said rear portion of said flexible member is in fully closed and fully opened positions; and wherein said control means is further operable, in response to actuation of said first ON/OFF switch means when said front portion of said flexible member is fully tilted up, to cause said first drive means to move said front portion of said flexible member rearwardly until said first lock detecting means detects that said front portion of said flexible member is in said fully opened position, and, in response to actuation of said second ON/OFF switch means when said rear portion of said flexible member is fully tilted up, to cause said second drive means to move said rear portion of said flexible member forwardly until said second lock detecting means detects that said rear portion of said flexible member is in said fully opened position.

4. A slidable roof control device as recited in claim 1, wherein
each of said first and second tilt means comprises a mounting bracket connected respectively to one of said front and rear portions of said flexible member, a cam member mounted on said mounting bracket and having a cam groove, a slider operatively connected respectively to one of said first and second drive means and being movable forwardly and rearwardly, and an engaging pin member mounted on said slider and engaging slidably in said cam groove.

5. A slidable roof control device as recited in claim 4, wherein
said cam groove of each of said cam members of said first and second tilt means, respectively, comprises a horizontal groove portion and an inclined groove portion extending downwardly and away from said horizontal groove portion.

6. A slidable roof control device as recited in claim 1, wherein
said first and second drive means comprise a first and a second drive motors, respectively, and portions of said first and second drive motors are superposed.

7. A slidable roof control device as recited in claim 1, wherein
portions of said first and second drive means are superposed.

8. A slidable roof control device as recited in claim 1, wherein
said first and second drive means are substantially wholly superposed relative to one another along the vertical direction.

9. A slidable roof control device as recited in claim 1, further comprising
a guide rail adapted to be mounted to the roof panel along the longitudinal direction of the vehicle body, said guide rail including an inside guide groove and an outside guide groove spaced laterally from said inside guide groove;
wherein one of said first and second tilt elements has a first shoe member mounted thereto which is slidably received in said outside guide groove; and
wherein the other of said first and second tilt elements has a second shoe member mounted thereto which is slidably received in said inside guide groove.

10. A slidable roof control device for a motor vehicle having a roof panel defining an upper portion of a vehicle body, a roof panel opening formed in said roof panel and enclosed by a front header, a right roof rail, a left roof rail and a rear header, and a flexible member mounted on the roof panel and being foldable in the longitudinal direction of the vehicle body, said control device comprising:
first drive means operatively interconnected with a front portion of said flexible member for selectively moving said front portion of said flexible member rearwardly so as to open a front portion of the roof panel opening and forwardly so as to close the front portion of the roof panel opening;
first tilt means, comprising first and second relatively movable tilt elements, operatively interconnected with said front portion of said flexible member for forcing said front portion of said flexible member to automatically tilt upwards, so as to be inclined upwardly and forwardly, as a result of one of said first and second tilt elements being moved rearwardly beyond a first predetermined location relative to the other of said first and second tilt elements, so as to form a clearance between said front portion of said flexible member and the vehicle roof panel;
second drive means operatively interconnected with a rear portion of said flexible member for selectively moving said rear portion of said flexible member forwardly to open a rear portion of the roof panel opening and rearwardly so as to close the rear portion of the roof panel opening;
second tilt means, comprising third and fourth relatively movable tilt elements, operatively interconnected with said rear portion of said flexible member for forcing said rear portion of said flexible member to automatically tilt upwards, so as to be inclined upwardly and rearwardly, as a result of one of said third and fourth tilt elements being moved forwardly beyond a second predetermined location relative to the other of said third and fourth tilt elements, so as to form a clearance between said rear portion of said flexible member and the vehicle roof panel;
control means for controlling operation of said first and second drive means;
first ON/OFF switch means for commanding said control means to operate said first drive means;
second ON/OFF switch means for commanding said control means to operate said second drive means;
first tilt-up detecting means for detecting when said front portion of said flexible member is fully tilted up, and for outputting a signal to said control means to indicate that said front portion of said flexible member is fully tilted up;
second tilt-up detecting means for detecting when said rear portion of said flexible member is fully tilted up, and for outputting a signal to said control means to indicate that said rear portion of said flexible member is fully tilted up; and
wherein said control means is operative to operate both of said first and second drive means in response to actuation of said first ON/OFF switch means, and is operative to operate only said second drive means in response to actuation of said second ON/OFF switch means.

11. A slidable roof control device as recited in claim 10, wherein
said control means is further operative, in response to actuation of said first ON/OFF switch means when said front and rear portions of said flexible member are located respectively at forwardmost and rearwardmost positions, to cause said first drive means to move said front portion of said flexible member rearwardly until said first tilt-up detecting means detects that said front portion of said flexible member is fully tilted-up, and to cause said second drive means to move said rear portion of said flexible member to move forwardly until said second tilt-up detecting means detects that said rear portion of said flexible member is fully tilted up.

12. A slidable roof control device as recited in claim 10, wherein
each of said first and second tilt means comprises a mounting bracket connected respectively to one of said front and rear portions of said flexible member, a cam member mounted on said mounting bracket and having a cam groove, a slider operatively connected respectively to one of said first and second drive means and being movable forwardly and rearwardly, and an engaging pin member mounted on said slider and engaging slidably in said cam groove.

13. A slidable roof control device as recited in claim 12, wherein
said cam groove of each of said cam members of said first and second tilt means, respectively, comprises a horizontal groove portion and an inclined groove portion extending downwardly and away from said horizontal groove portion.

14. A slidable roof control device as recited in claim 10, wherein
said first and second drive means comprise a first and a second drive motors, respectively, and portions of said first and second drive motors are superposed.

15. A slidable roof control device as recited in claim 10, wherein
portions of said first and second drive means are superposed.

16. A slidable roof control device as recited in claim 10, wherein
said first and second drive means are substantially wholly superposed relative to one another along the vertical direction.

17. A slidable roof control device as recited in claim 10, further comprising
a guide rail adapted to be mounted to the roof panel along the longitudinal direction of the vehicle body, said guide rail including an inside guide groove and an outside guide groove spaced laterally from said inside guide groove;
wherein one of said first and second tilt elements has a first shoe member mounted thereto which is slidably received in said outside guide groove; and
wherein the other of said first and second tilt elements has a second shoe member mounted thereto which is slidably received in said inside guide groove.

* * * * *